Patented Nov. 30, 1948

2,454,796

UNITED STATES PATENT OFFICE 2,454,796

POLYMERIZATION OF ROSIN

Burt L. Hampton, Jacksonville, Fla., assignor, by mesne assignments, to The Glidden Company, Cleveland, Ohio, a corporation of Ohio No Drawing. Application June 10, 1946, Serial No. 675,829

10 Claims. (Cl. 260—97)

The present invention relates to improvement in processes for polymerizing gum and wood rosins.

Polymerized rosin and its useful derivatives have many advantageous properties over ordinary unpolymerized rosin and its derivatives, such as higher melting points, higher viscosities, greater stability toward oxidation and many others. Many processes for polymerizing rosin have been proposed in the past, and many of these rely on the properties of certain metallic salts to catalyze the reactions which take place. United States Patent No. 2,263,915 describes processes of the kind mentioned in which the chlorides of amphoteric metals are employed as catalysts, and in which ester-type solvents for the rosin are used. This patent particularly mentions antimony pentachloride as being a suitable catalyst, and also refers generally to the use of small amounts of acid to activate the catalysts. According to the statements of this patent, however, the catalyst is employed in amounts of "from about 1% to about 50%, and preferably from about 5% to about 15% by weight based on the weight of rosin."

I have now found, however, that antimony chlorides and bromides, when activated by small amounts of free hydrochloric or hydrobromic acids, are effective catalysts when used in amounts less than 1% ranging downwardly to amounts as little as .01%. By reason of my discovery in this connection, it becomes possible to employ such reduced quantities of the catalysts, and thereby to minimize the washing difficulties which are a serious handicap in the prior processes.

Accordingly, it is an object of my invention to provide an improved process for polymerizing rosins with the aid of activated antimony chlorides and bromides as catalysts.

It is a further object of my invention to employ reduced amounts of activated catalyst, and thereby, substantially to overcome the prior difficulties involved in washing out the catalyst.

These and other objects will be apparent to those skilled in the art from the following description, and are accomplished in accordance with the invention by effecting the polymerization of rosin in the combined presence of small amounts of tri- and pentavalent antimony chlorides or bromides, and small amounts of free hydrochloric or hydrobromic acids. These halides of antimony are activated by the free acids to such an extent that only small amounts of the antimony salts, less than about 1%, are needed. Amounts over 1% can be used to effect the polymerization of rosins but these larger amounts are difficult to wash out of the polymerized material, and hence create disadvantages which are not offset by accompanying advantages. Consequently I employ amounts less than about 1%, and prefer to use amounts between about 0.3% and 0.8%.

The antimony catalysts may be introduced into the batch which is to be polymerized in the form of the tri- or pentavalent chloride or bromide salts, or these salts may be formed in situ in the batch by effecting a reaction between the activating acids and an antimony-containing material such as metallic antimony, or the antimony oxides, hydroxides, carbonates, fluorides and iodides. It will be appreciated, however, that if the catalyst salts are formed in situ, the activating acids are consumed by the reaction, and enough additional acid or acid-producing material should be introduced to convert all of such antimony-containing materials to the corresponding salts and to provide some free acid in addition.

Only a small amount of free acid is needed to effect the activation, but amounts more than a mere trace should be provided to ensure continued activation throughout the duration of the polymerization treatment. For most purposes initial concentrations of free acid between about .2% and .5% provide an adequate excess but under less favorable conditions such as those of prolonged treatment greater initial concentrations of around 2% to 3%, or even up to 5% may be needed. It is within the ability of one skilled in the art to determine the desired concentrations under his selected working conditions, in accordance with the foregoing indications. It should be recognized however, that the free acid should be kept sufficiently low to avoid undesirable degradation of the material being treated, or of the final product. The activating hydrochloric or hydrobromic acids may of course be introduced in the form of the hydrogenhalide compounds, but they may also be formed in situ by employing HCl-producing or HBr-producing materials. Such hydrogenchloride producing and hydrogenbromide-producing compounds are well-known to those skilled in the art, but for purposes of example, the following materials are mentioned: chlorine, phosphorous chlorides, phosphorous bromides, benzoyl chloride, acetyl chloride, and other organic acid chlorides or bromides. The reactions which are involved in producing free hydrogenhalides from these and like materials are well understood. Reference may be made, however to "An Outline of Organic Chemistry" by Degerring, published in 1941 (4th edition) where typical reactions with aliphatic and aromatic compounds are explained on pages 37 and 185-187 respectively.

While the polymerization may be carried out on the molten rosin, it is preferable to carry it out on rosin dissolved in an inert solvent. Suitable solvents are glacial acetic acid, mineral spirits, toluene, xylene, chloro-benzene, ethylene chloride, and many other liquids known already to those skilled in the art. Various concentrations of rosin in solvent from about 30% to 100% have been employed with success, and of these, a solution of about 80% rosin has been found to be the most desirable from practical considerations.

Rosin generally contains some oxidized products and upon addition of the hydrohalogen or of the hydrogenhalide-producing material, small quantities of water are formed. Likewise, when an oxidic antimony compound is employed for in situ production of the catalyst, water is formed by reaction between it and the hydrohalogen acid. The removal from the rosin or rosin solution of water from such sources is not essential to effect polymerization, but for producing the more highly polymerized materials it is advantageous to remove such water as well as any water present as such in the rosin or rosin solution.

According to a preferred procedure, a solution of rosin is first formed in an inert solvent. A small quantity of an antimony halide or of an oxide of antimony is then added. Hydrogen chloride, or a material which yields HCl is next added in a quantity sufficient to produce some free HCl. The solution is then heated to the desired temperature, which preferably is around the boiling point of the solution but which may be any temperature between about 50° C. and 165° C., and is heated for a predetermined time between about ½ hour and 100 hours to produce the desired degree of polymerization. The concentration of solvent in the mass is then adjusted (if necessary to facilitate washing) and the solution is washed with water, to ensure removal of the metal halide catalyst. Acid may be added to the wash water to assist in the removal where the amount of catalyst employed is much larger than the preferred range, supra. In case the polymerization is carried out on molten rosin, treating temperatures ranging from the melting point to about 165° C. may be employed, and after the treatment is completed the polymerized rosin should be dissolved in solvent for washing, and then washed. In either case the washed solution is next distilled or otherwise treated to separate the solvent. After such distillation or separation, the product is characterized by the presence of loosely combined HCl. This product would present disadvantages in manufacturing various other products therefrom, such as ester gum, etc., in which heating to elevated temperatures is employed. It is therefore desirable to remove the loosely combined HCl. This can be done by bringing the polymerized rosin to temperatures of the order of 250° C. to 340° C., and sparging the heated rosin by passing in steam or other inert gas or vapor to sweep out the liberated HCl. Bromine, hydrogen bromide, or a material which yields HBr may be used in place of the corresponding chlorine materials, and in the same way.

The product after removal of all of the HCl or HBr will be found to have a higher melting point and a higher viscosity in solution, and to be more resistant to oxidation than the original rosin.

The following examples are illustrative of the invention:

Example 1

400 parts of metal free K gum rosin of R&B M. P. 83° C. and A. N. 170 was dissolved in 100 parts of mineral spirits and 2 parts of SbCl₃ together with 2 parts of chlorine added to the solution which was then heated to 140-150° C. for 5 hours. After diluting with mineral spirits the solution was washed three times with water. On washing with water some trouble was encountered with a white precipitate of SbOCl₂. The solvent was then removed with steam the final temperature of the resin being 220° C. Grade G, A. N. 170, R&B M. P. 89.5° C. A portion of this resin was heat treated with gentle steaming at 270-280° C. for 1 hour. Grade K, A. N. 163, R&B M. P. 90° C.

Example 2

400 parts of the gum rosin used in Example 1 above was dissolved in 100 parts of acetic acid and 2 parts of SbCl₃ together with 2 parts of chlorine were added to the solution which was then heated to 120-125° C. for 5 hours. The solution was then poured into mineral spirits and washed four times with hot water. Some trouble was had with a white precipitate of SbOCl₂. The solvent was removed with steam, the final temperature of the resin being 220° C. Grade H, R&B M. P. 93° C., A. N. 169.

Example 3

400 parts of WG gum rosin M. P. 78° C., A. N. 168 from which the metals had been removed by an acid wash of the original gum was dissolved in 100 parts of acetic acid and 0.8 part of Sb₂O₃ together with 3 parts of chlorine were added. The solution was refluxed gently for 6 hours, poured into hot mineral spirits and washed three times with hot water. The solvent was removed with steam, the final temperature of the resin being 200° C. R&B M. P. 86° C., acid number 164.

When acetic acid is used as the solvent it can be recovered by distilling out of the reaction solution under a slight vacuum to keep the temperature down. The resin can then be dissolved in the mineral spirits or other similar solvent and washed as usual.

Blank 1

400 parts of WG gum rosin from which the metals had been removed by an acid wash of the original gum was dissolved in 100 parts of acetic acid and 1.6 parts of chlorine added. The solution was kept at a gentle reflux temperature for 6 hours, poured into mineral spirits, washed two times with hot water and run down to resin with steam. The final temperature of the resin was 200° C., M. P. (R&B) 81° C., acid number 164. The melting point of the original rosin was 80° C. and the acid number 166.

Blank 2

500 parts of metal free K gum rosin of M. P. 84° C., A. N. 169 was dissolved in 125 parts of mineral spirits and 2.5 parts of chlorine added. The solution was heated at 140-150° C. for 5 hours, diluted with solvent and washed three times with hot water. The solvent was removed with steam, the final temperature of the resin being 220° C. Grade H. M. P. 83° C., A. N. 170.

From a comparison of these blanks with the preceding examples, it is seen that in the absence of metal salt and in the presence of the free HCl alone no polymerization is effected.

From the foregoing examples and explanations, it will be recognized that the invention in its broadest aspects relates to the polymerization of rosin in liquid phase, either as molten rosin or as a solution of rosin in a suitable inert solvent, by means of an activated antimony chloride or bromide as polymerization catalyst. While the antimony chlorides or bromides may be employed as such, either or both may be generated in situ by reaction of an oxidic antimony compound with hydrogen chloride or hydrogen bromide, or by reaction of an antimony iodide or fluoride with either of the acids. The hydrohalogen acid which is employed may be introduced as such, or it too may be formed in situ by employing a halogen-containing material which produces the desired hydrohalogen acid under the conditions of treatment.

It will be recognized that the invention also contemplates the treatment of the polymerized rosin (as produced by any of the forms of the invention just described above), by a washing step, the purpose of which is to remove the catalyst; by a treating step which separates the polymerized rosin from any solvent which may have been employed during the polymerization process or washing step; and by a sparging step having the function of removing any loosely-combined hydrogenhalide remaining in the polymerized rosin after the washing and solvent separation steps.

The polymerization step, as effected by the presence of the herein disclosed activated catalysts, may be carried out at the indicated temperatures for periods of time of from about ½ hour to about 100 hours, or for sufficient time to effect polymerization of at least some of the rosin. Considerable polymerization, as indicated by the higher melting points of the products of the examples, can be accomplished in a matter of a few hours, and for most purposes a treatment lasting from ½ hour to about 30 hours is adequate to accomplish commercially desirable results.

Having now disclosed the invention, what I claim is:

1. The process for polymerizing rosin which comprises the step of treating rosin in liquid phase with an effective amount less than 1% of a catalytic material selected from the group consisting of the chlorides and bromides of antimony, in combination with a small amount of free hydrogenhalide selected from the group consisting of hydrogen chloride and hydrogen bromide, said treating step being carried on at temperatures between about 50° C. and 165° C. for a time sufficient to effect polymerization of at least some of the rosin.

2. The process for polymerizing rosin which comprises the step of treating rosin in liquid phase with an effective amount less than 1% of a catalytic material selected from the group consisting of the chlorides and bromides of antimony for a time between about ½ hour and 100 hours, at temperatures between about 50° C. and 165° C., said catalytic material being formed in situ by reaction of (1) an antimony-containing substance selected from the group consisting of metallic antimony and the oxides, hydroxides, carbonates, fluorides and iodides of antimony, with (2) a stoichiometric excess of a hydrogenhalide selected from the group consisting of hydrogen-chloride and hydrogen-bromide.

3. The process of claim 1 wherein said catalytic material is used in amounts of between about 0.3% and 0.8%.

4. The process of claim 2 wherein said catalytic material is used in amounts of between about 0.3% and 0.8%.

5. The process of claim 1 wherein said hydrogenhalide is obtained in situ from a halogen-containing substance capable of yielding the said hydrogenhalide under the conditions of treatment.

6. The process of claim 2 wherein said hydrogenhalide is obtained in situ from a halogen-containing substance capable of yielding the said hydrogenhalide under the conditions of treatment.

7. The process of claim 1 wherein said rosin in liquid phase consists of rosin dissolved in an inert solvent, and the process includes the additional steps of washing the treated rosin solution, thereafter separating the solvent from said solution to recover the polymerized rosin, and sparging the polymerized rosin at temperatures between about 250° C. and 340° C. with an inert gas to remove loosely combined hydrogenhalide from said polymerized rosin.

8. The process of claim 2 wherein said rosin in liquid phase consists of rosin dissolved in an inert solvent, and the process includes the additional steps of washing the treated rosin solution, thereafter separating the solvent from said solution to recover the polymerized rosin, and sparging the polymerized rosin at temperatures between about 250° C. and 340° C. with an inert gas to remove loosely combined hydrogenhalide from said polymerized rosin.

9. The process for polymerizing rosin which comprises the steps of: treating molten rosin with an effective amount less than about 1% of a catalytic material selected from the group consisting of the chlorides and bromides of antimony in combination with a small amount of free hydrogenhalide selected from the group consisting of hydrogen chloride and hydrogen bromide, said treatment being carried on at temperatures ranging from the melting point of the rosin to about 165° C. for a time sufficient to effect polymerization of at least some of the rosin; thereafter dissolving the treated rosin in solvent to form a washable solution; washing the rosin solution; separating the solvent from said washed solution to recover the treated rosin; and sparging the recovered rosin at temperatures between about 250° C. and 340° C. with inert gas to remove loosely-combined hydrogenhalide therefrom.

10. The process as claimed in claim 9 wherein from about 0.3% to 0.8% of said catalytic material is employed.

BURT L. HAMPTON.

REFERENCES CITED

The following references are of record in the file of this patent:

UNITED STATES PATENTS

| Number | Name | Date |
|--------|------|------|
| 2,263,915 | Borglin | Nov. 25, 1941 |
| 2,298,270 | Auer | Oct. 13, 1942 |